United States Patent
Bucksch et al.

(10) Patent No.: US 9,518,500 B2
(45) Date of Patent: Dec. 13, 2016

(54) ARRANGEMENT FOR FITTING AN EXHAUST CLEANING UNIT IN AN EXHAUST PASSAGE

(71) Applicants: Ragnar Bucksch, Årsta (SE); Göran Granqvist, Kungsör (SE)

(72) Inventors: Ragnar Bucksch, Årsta (SE); Göran Granqvist, Kungsör (SE)

(73) Assignee: SCANIA CV AB (SE)

( * ) Notice: Subject to any disclaimer, the term of this patent is extended or adjusted under 35 U.S.C. 154(b) by 116 days.

(21) Appl. No.: 14/359,639

(22) PCT Filed: Nov. 13, 2012

(86) PCT No.: PCT/SE2012/051238
§ 371 (c)(1),
(2) Date: May 21, 2014

(87) PCT Pub. No.: WO2013/077797
PCT Pub. Date: May 30, 2013

(65) Prior Publication Data
US 2014/0298782 A1 Oct. 9, 2014

(30) Foreign Application Priority Data
Nov. 22, 2011 (SE) ...................... 1151109

(51) Int. Cl.
*F01N 3/00* (2006.01)
*F01N 3/02* (2006.01)
(Continued)

(52) U.S. Cl.
CPC ............. *F01N 13/08* (2013.01); *F01N 3/0211* (2013.01); *F01N 3/035* (2013.01); *F01N 3/0335* (2013.01);
(Continued)

(58) Field of Classification Search
CPC .... F01N 13/08; F01N 13/185; F01N 13/1855; F01N 3/0211; F01N 3/0335; F01N 3/035; F01N 3/2867; F01N 3/2875; F01N 3/2885; F01N 2350/04; F01N 2450/30
(Continued)

(56) References Cited

U.S. PATENT DOCUMENTS 3,675,398 A 7/1972 Giarrizzo ........................ 55/316
4,927,608 A 5/1990 Worner ......................... 422/179
(Continued)

FOREIGN PATENT DOCUMENTS

CN 1886578 A 12/2006
DE 3632059 C1 3/1988
(Continued)

OTHER PUBLICATIONS

International Search Report mailed Mar. 1, 2013 in corresponding PCT International Application No. PCT/SE2012/051238.
(Continued)

*Primary Examiner* — Audrey K Bradley
*Assistant Examiner* — Dapinder Singh
(74) *Attorney, Agent, or Firm* — Ostrolenk Faber LLP

(57) ABSTRACT

An arrangement for fitting an exhaust cleaning unit (2) in an exhaust passage (1*b*): An annular resilient component (7) is fitted around the exhaust cleaning unit (2) at a distance from a gasket (5). The annular resilient component (7) has a first contact portion (7*a*) which comes into contact with a wall surface (3) of the exhaust cleaning unit (2) and a second contact portion (7*b*) which comes into contact with a wall surface (1*b*) of the exhaust passage when the exhaust cleaning unit (2) is in a fitted state in the exhaust passage. The annular resilient component (7) keeps the exhaust cleaning unit (2) in a centered position in the exhaust passage with a spring force.

10 Claims, 2 Drawing Sheets

(51) Int. Cl.
*F01N 3/10* (2006.01)
*F01N 3/20* (2006.01)
*F01N 13/08* (2010.01)
*F01N 3/28* (2006.01)
*F01N 13/18* (2010.01)
*F01N 3/021* (2006.01)
*F01N 3/033* (2006.01)
*F01N 3/035* (2006.01)

(52) U.S. Cl.
CPC ........... *F01N 3/2867* (2013.01); *F01N 3/2875* (2013.01); *F01N 3/2885* (2013.01); *F01N 13/185* (2013.01); *F01N 13/1855* (2013.01); *F01N 2350/04* (2013.01); *F01N 2450/30* (2013.01)

(58) Field of Classification Search
USPC .................................................... 60/299, 324
See application file for complete search history.

(56) References Cited

U.S. PATENT DOCUMENTS

| | | | |
|---|---|---|---|
| 7,470,312 B2 | 12/2008 | Ohya | 96/386 |
| 2003/0106304 A1* | 6/2003 | Miyahara | F02D 41/222 60/277 |
| 2004/0156761 A1 | 8/2004 | Bruck | 422/179 |
| 2005/0077104 A1 | 4/2005 | Flintham | 181/243 |
| 2007/0137188 A1 | 6/2007 | Ohya | 60/311 |
| 2008/0176029 A1 | 7/2008 | Ichikawa | 428/117 |
| 2010/0024407 A1 | 2/2010 | Merchant et al. | 60/311 |
| 2011/0023452 A1* | 2/2011 | Gisslen | F01N 13/1827 60/272 |
| 2011/0042546 A1 | 2/2011 | Beatty et al. | 248/603 |

FOREIGN PATENT DOCUMENTS

| | | |
|---|---|---|
| DE | 103 57 953 A1 | 7/2005 |
| DE | 10 2009 012 892 A1 | 9/2010 |
| EP | 1701011 A1 | 9/2006 |
| EP | 1 707 773 A1 | 10/2006 |
| EP | 2 110 528 A1 | 10/2009 |
| JP | 2005-171913 | 6/2005 |
| WO | WO 2008/004492 A1 | 1/2008 |

OTHER PUBLICATIONS

Chinese Office Action, Dated Sep. 21, 2015, issued in corresponding Chinese Patent Application No. 201280057147.3. English Translation. Total 11 pages.
Chinese Office Action, Dated Apr. 27, 2016, issued in corresponding Chinese Patent Application No. 201280057147.3. English Translation. Total 12 pages.
Japanese Office Action, Dated Apr. 16, 2015, issued in corresponding Japanese Patent Application No. 2014-543446. English Translation. Total 10 pages.
Russian Federation Decision on Grant, Dated Jun. 16, 2015, Issued in corresponding Russian Patent Application No. 2014125258/06(041078). English Translation. Total 12 pages.
Supplementary European Search Report, Dated Jun. 15, 2015, issued in corresponding European Patent Application No. EP12852299. Total 2 pages.
Swedish Office Action, Dated May 9, 2012, issued in corresponding Swedish Patent Application No. 1151109-4. Total 7 pages.

* cited by examiner

ARRANGEMENT FOR FITTING AN EXHAUST CLEANING UNIT IN AN EXHAUST PASSAGE

CROSS-REFERENCE TO RELATED APPLICATIONS

The present application is a 35 U.S.C. §§371 national phase conversion of PCT/SE2012/051238, filed Nov. 13, 2012, which claims priority of Swedish Patent Application No. 1151109-4, filed Nov. 22, 2011, the contents of which are incorporated by reference herein. The PCT International Application was published in the English language.

BACKGROUND TO THE INVENTION AND PRIOR ART

The present invention relates to an arrangement for fitting an exhaust cleaning unit in an exhaust passage of an engine, particularly in a vehicle.

An exhaust line leading exhaust gases out from a diesel engine in a heavy vehicle comprises usually a plurality of exhaust cleaning units, e.g. a particle filter, an oxidation catalyst and an SCR catalyst. This makes it possible for the exhaust gases to be cleaned so as to meet the increasingly stringent requirements with regard to discharge of emissions. The aforesaid exhaust cleaning units may with advantage be fitted in a silencer in the exhaust line, but the cleaning units have sensitive surfaces and may need to be replaced after a certain period of use. In particular, a particle filter will become blocked relatively quickly and may need to be replaced or cleaned relatively frequently.

However, it is often difficult to reach and replace an exhaust cleaning unit in an exhaust line, particularly if it is fitted inside a silencer. It is also difficult to achieve a completely gastight installation of an exhaust cleaning unit in the silencer, which entails having to create an internally tight closure to ensure that no exhaust gases can leak past the exhaust cleaning unit in the silencer. If such leakage occurs, the necessary requirements for exhaust cleaning may not be met. It is also necessary to create an internally tight closure to ensure that no exhaust gases leak out from an openable cover or similar device which is required to make it possible to fit an exhaust cleaning unit inside the silencer. If exhaust gases leak out from the silencer, surrounding equipment items in the vehicle may be damaged by the warm exhaust gases.

SUMMARY OF THE INVENTION

The object of the present invention is to propose an arrangement which makes it possible in a relatively simple and uncomplicated way to fit/remove an exhaust cleaning unit in/from an exhaust passage.

This object is achieved with the arrangement of the invention. According to the present invention, the exhaust cleaning unit is provided with an annular resilient component placed around the peripheral surface of the exhaust cleaning unit. The annular resilient component has a first contact portion in contact with the exhaust cleaning component and a second contact portion in contact with an internal wall surface in the exhaust passage. The component has the characteristic of keeping the exhaust cleaning unit in a centered position within the exhaust passage with a resilient force during fitting/removal in/from the exhaust passage. The fact that the annular resilient component keeps the exhaust cleaning unit in a centered position in the exhaust passage prevents the exhaust cleaning unit from assuming an oblique or canted position during the fitting work. Such an annular resilient component also eliminates the need for the exhaust cleaning unit to undergo any turning movements during the fitting work. Substantially all of the fitting work therefore involves pushing the exhaust cleaning unit into the exhaust passage with a linear movement. The fitting work thus becomes quite uncomplicated. The annular resilient component also provides assurance that during operation, the exhaust cleaning unit is kept in a centered position in the exhaust passage.

In another embodiment of the invention, the second contact portion is at an axial distance along the exhaust cleaning unit from the first contact portion. Such an annular resilient component may have a relatively simple but functional shape. It may have an external surface which, from the first contact portion towards the second contact portion, is at a progressively increasing radial distance from the exhaust cleaning unit. This makes it relatively easy to push the annular resilient component together when the exhaust cleaning unit is being put into or pulled out of the exhaust passage. The annular resilient component has slitlike recesses and intermediate limb portions which embrace the first contact surface or the second contact portion. Such limb portions provide the annular portion with good resilient characteristics in a radial direction. The annular resilient component is with advantage made of material with good resilient characteristics which are substantially uniform over the whole range of temperatures which prevail in the exhaust passage. The annular resilient component is with advantage made of steel material with the characteristics indicated above.

In another embodiment of the invention, the arrangement comprises a gasket fitted around the exhaust cleaning unit to serve as a seal between the exhaust cleaning unit and an internal wall surface of the exhaust passage.

In this case, the exhaust cleaning unit is thus provided with a gasket which provides the seal between the exhaust cleaning unit and the exhaust passage wall surface. The fact that the gasket is required to seal between the exhaust cleaning unit and the exhaust passage wall surface means that it has to at least some extent to be compressed during the fitting work, so a relatively large force is required for inserting the exhaust cleaning unit into the exhaust passage. The gasket is with advantage at an appropriate distance from the annular resilient component. The annular resilient component prevents the exhaust cleaning unit from assuming an oblique or canted position during the fitting work, thereby avoiding damage to the gasket and risk of leakage during operation.

In another embodiment of the invention, the exhaust cleaning unit has at least one gripping means for a tool intended to be used for inserting the exhaust cleaning unit to a fitting position in the exhaust passage and/or pulling it out from that position. A relatively large force is therefore required for inserting and fitting the exhaust cleaning unit in the exhaust passage and for pulling it out and removing it therefrom. In this case a suitable tool may be used. The tool is with advantage connected to all of the gripping means, which may be situated at an outer end of the exhaust cleaning unit so that they are easy to reach in order to connect them to the tool.

In another embodiment of the invention, the exhaust cleaning unit has at least one fastening device by which it is possible to releasably fasten the exhaust cleaning unit in an intended fitting position in the exhaust duct. Such a fastening device is with advantage arranged to fix an outer end of the exhaust cleaning unit relative to the exhaust passage when the exhaust cleaning unit has been inserted to an intended fitting position in the exhaust passage. The fastening device may comprise screw means or the like by which it is possible to releasably fix the exhaust cleaning unit relative to the exhaust passage. A plurality of such fastening devices may be provided at appropriate points round the exhaust cleaning unit to ensure its secure fastening in the exhaust passage.

In another embodiment of the invention, the exhaust cleaning unit is a particle filter unit. Particle filter units become obstructed over time and need replacing relatively frequently. The exhaust cleaning unit may be fittable in an exhaust passage in a silencer. A silencer in an exhaust line comprises an empty space which may with advantage be used to accommodate one or more exhaust cleaning units. It is also possible to fit other types of exhaust cleaning units, e.g. oxidation catalysts and SCR catalysts, in the exhaust passage in the same way as the particle filter unit. An oxidation catalyst and an SCR catalyst may be fitted without gaskets, whereas a particle filter needs a gasket. The silencer may have an aperture to the exhaust passage with a releasable fittable cover for fitting the exhaust cleaning unit in the exhaust passage. The cover may here be fitted in conjunction with a gasket to achieve a guaranteed tight closure in a fitted state. The cover and the gasket may be fitted on a fastening portion which extends round the aperture, by means of a V-clamp or the like. The result is an external seal to ensure that during operation no exhaust gases will leak out via the aperture.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
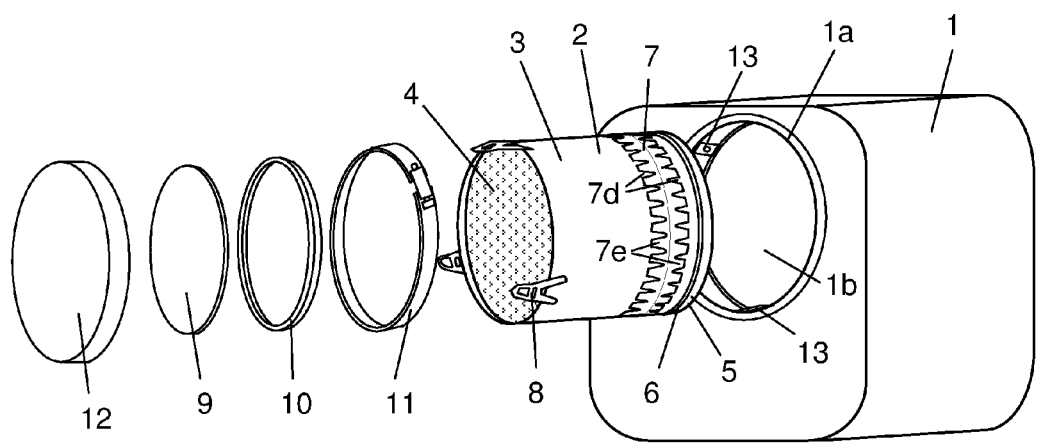
FIG. 1 depicts an arrangement provided with components for fitting a particle filter unit in a silencer.

FIG. 1 depicts a silencer 1 suited to being placed in an exhaust line which leads the exhaust gases out from a combustion engine of a vehicle. The silencer has an inlet aperture and an outlet aperture for exhaust gases, although these apertures are situated on sides of the silencer which are not visible in FIG. 1. The silencer has an internal exhaust passage which extends between the inlet aperture and the outlet aperture. The silencer has in a wall surface an aperture 1a which leads to a cylindrical space in a tubular element 1b for accommodating a particle filter unit 2. This tubular element forms part of the exhaust passage through the silencer. The particle filter unit comprises a tubular wall section 3 enclosing a particle filter 4 which is intended to filter out soot particles from the exhaust gases. The silencer may with advantage contain also an oxidation catalyst and an SCR catalyst. An oxidation catalyst will oxidise nitrogen monoxide NO to nitrogen dioxide $NO_2$, increasing the proportion of nitrogen dioxide in the exhaust gases so that an SCR catalyst situated downstream can achieve optimum reduction of the nitrogen oxides $NO_x$ in the exhaust gases.

The particle filter unit 2 is provided at a forward first end with an annular gasket 5 which extends round the periphery of the tubular wall section 3 and which may be made of graphite. A stop ring 6 is provided close to the gasket to keep the gasket in an intended position when the particle filter is being inserted into the silencer. An annular resilient component 7 is placed round the tubular wall section 3 at an axial distance from the gasket 5. The annular resilient component is with advantage made of spring steel which can undergo relatively large deformations without suffering fractures or permanent changes of shape.

The particle filter unit 2 is provided at a rear second end with three gripping means 8 fastened at appropriate mutual spacing round the periphery of the tubular wall section 3. These gripping means are intended to be gripped by a tool when the particle filter unit is to be fitted in/removed from the silencer. Each of them is also used here to fasten the particle filter unit in the silencer by means of three fastening devices 13 which are fastenable inside the silencer close to the aperture 1a. A cover 9 fitted in conjunction with an annular gasket 10 which is with advantage made of graphite is used to close the aperture 1a. The cover and the gasket are fastened at the sides of the aperture 1a by means of a V-clamp 11. Finally, a protective device 12 is fastened on the silencer at a position outside the cover 10.

Figure 2:
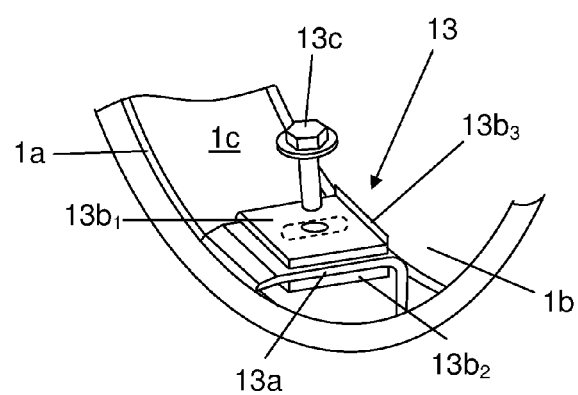
FIG. 2 depicts a fastening device for fastening the particle filter in the silencer and FIG. 3 is a sectional view of the particle filter unit in a fitted state inside the silencer.

FIG. 2 depicts one of the fastening devices 13 in more detail. It comprises a fixed portion 13a firmly anchored in a suitable way in the silencer, e.g. by welding. This fixed portion has a platelike element provided with a long and narrow hole. The fastening device comprises a movable portion 13b consisting of a first platelike element $13b_1$ and a second platelike element $13b_2$ which are connected to one another at an end surface. Assembling the fastening device 13 involves pushing the movable portion 13b on from the side of the fixed portion 13a so that the first element $13b_1$ is above the fixed portion 13a and the second element $13b_2$ is below the fixed portion 13a. The first element $13b_1$ and the second element $13b_2$ each have a hole running through them to accommodate a screw means 13c. When the movable portion 13b has been pushed onto the fixed portion 13a, a screw means 13c can be inserted down through the first element $13b_1$ of the movable portion, the elongate hole in the fixed portion and the hole in the second element $13b_1$ of the movable portion. So long as the screw means 13c is not pulled out, the elongate hole in the fixed portion 13a will allow movement of the movable portion 13b in a longitudinal direction relative to the particle filter unit 2. The first element $13b_1$ of the movable portion has a stop portion $13b_3$ adapted to coming into contact with an end surface of the particle filter unit. Fastening the particle filter unit in the silencer in a fitting position involves the movable portion 13b being moved to a position at which the stop portion $13b_3$ comes into contact with the particle filter unit. The screw means 13c will then be tightened so that the particle filter unit is fixed in an intended fitting position in the silencer. The fixed portion 13a of the fastening device creates a space 1c between the tubular element 1b and the edges which define the aperture 1a. This space 1c is a portion of the exhaust passage which is adjacent to the portion of the exhaust passage which is defined by the tubular element.

Figure 3:
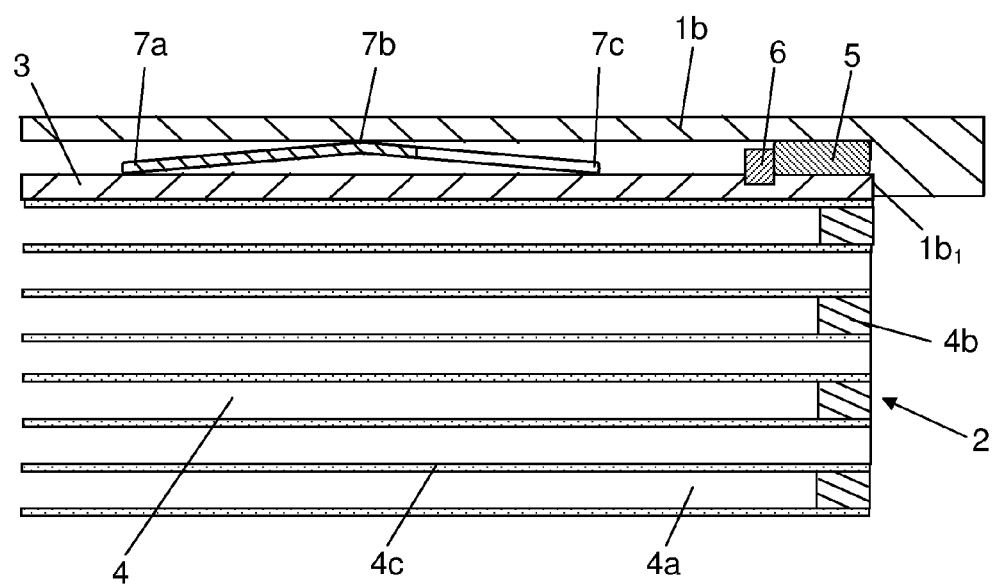

FIG. 3 is a sectional view of the particle filter unit 2 in a fitted state inside the silencer. The particle filter 4 is made of porous material with thin elongate ducts 4a which are provided with stop surfaces 4b at appropriate points. These stop surfaces force the exhaust gases to go into adjacent elongate ducts in the particle filter. The porous walls 4c of the ducts allow the exhaust gases, but not soot particles, to pass through. The soot particles thus become trapped inside the particle filter, in which they are subsequently intended to be burnt, but for this to take place a high temperature needs to be maintained in the particle filter, which in many operating situations is not possible. The particle filter inevitably becomes obstructed over time and needs replacing.

The particle filter unit 2 has here been inserted to an extreme position defined by a stop surface $1b_1$. The stop ring 6 prevents displacement of the gasket 5 from an intended fastening position on the particle filter unit. The annular resilient component comprises a first contact portion 7a in contact with a peripheral surface of the particle filter unit, a second contact portion 7b in contact with an internal wall surface of the tubular element 1b, and a third contact portion 7c in contact with a peripheral surface of the particle filter unit. The contact portions 7a-c are at axial distances from one another. The second contact portion 7b is at a radial distance from the tubular element.

The first contact portion 7a and the second contact portion are at opposite edges of the annular resilient component and the second contact portion 7b is substantially halfway between said edges. The annular resilient component has an external surface which is, from the first contact portion 7a towards the second contact portion 7b, at a progressively increasing distance from the particle filter unit 2. The annular resilient component has an external surface which is, from the second contact portion 7b towards the third contact portion 7c, at a progressively decreasing distance from the particle filter unit. The annular resilient component thus has a V-shaped cross-section. It has at the two edges slitlike recesses 7d and intermediate limb portions 7e which embrace the first contact surface 7a and the third contact surface 7c. The annular resilient component 7 thus acquires good resilient characteristics in a radial direction within the tubular element 1b.

The first step in removing a particle filter unit 2 from the silencer 1 is to unscrew the protective plate 12 from the silencer so that the cover 9 becomes visible. The V-clamp 11 is then released so that the cover 9 and the gasket 10 can be removed to expose the aperture 1a in the silencer. This is followed by releasing the screw means 13c and the fastening devices 13 which hold the particle filter unit firmly inside the silencer. It will now be possible to pull the particle filter unit out of the silencer. The presence of the annular resilient component 7 and the gasket 5 situated between the particle filter unit and the tubular element 1b makes it difficult to pull the particle filter unit out of the silencer without auxiliary means. A suitable tool is therefore fastened in the gripping means 8 and is anchored on one or more predetermined fastening points on the silencer. The tool is activated so as to pull the particle filter unit out of the tubular element 1b in the silencer. The particle filter unit may then be sent away for scrapping or cleaning. The gaskets 5, 10 will be scrapped.

A completely new or renovated particle filter unit which is to be fitted in the silencer will be provided with a new gasket 5 at the forward end. The particle filter unit will then be inserted in the silencer via the aperture 1a so that its first end is fitted at a position adjacent to the tubular element 1b. The tool is fitted on the gripping means 8 and one or more predetermined fastening points on the silencer. The tool is then activated to push the particle filter unit into the tubular element. The annular resilient component 7 centres the particle filter unit in the tubular element during this movement, eliminating any risk of the particle filter unit and the gasket assuming an oblique position relative to the tubular element, thus ensuring that the gasket will not be damaged. The pushing movement ends when the particle filter unit reaches the stop surface $1b_1$. Alternatively, the tool may have a travel length such that the particle filter unit will always be at a desired position when the tool reaches an extreme position. The fastening devices 13 are then fitted as mentioned above so that the particle filter unit is fixed in a longitudinal direction. The cover 9 and a new gasket 10 are fixed close to an edge surface of the aperture 1a by means of the V-clamp 11. Finally, the protective plate 12 is fastened by screws on the silencer so that it masks the cover and the V-clamp.

The annular resilient component 7 substantially eliminates any risk of damage to the gasket 5 during the fitting work. There is therefore no risk of any of the exhaust gases being led past the particle filter 4 and not being filtered. The risk of internal leakage is thus substantially eliminated. The gasket 10 and the V-clamp provide the cover with a tight fit close to the aperture 1a, with consequently no risk of the exhaust gases leaking out via the aperture 1a. The risk of warm exhaust gases leaking out from the silencer is therefore very slight.

The invention is in no way restricted to the embodiments described but may be varied freely within the scopes of the claims.

The invention claimed is:

1. An arrangement for fitting an exhaust cleaning unit in an exhaust passage for exhaust from an engine, the exhaust passage passing through an aperture in a part of the engine, the arrangement comprising:
   a gasket fitted around the exhaust cleaning unit and configured, located and operable to serve as a seal between the exhaust cleaning unit and an internal wall surface of the exhaust passage; and
   an annular resilient component which is fitted around the exhaust cleaning unit at a distance from the gasket, the annular resilient component having a first contact portion configured, located, and operable to come into contact with a wall surface of the exhaust cleaning unit and a second annular contact portion configured, located and operable to come into contact with a wall surface of the exhaust passage when the exhaust cleaning unit is in a fitted state in the exhaust passage, and the annular resilient component is configured and operable for keeping the exhaust cleaning unit in a centered position in the exhaust passage with a spring force of the annular resilient component.

2. An arrangement according to claim 1, further comprising at least one grip on the exhaust cleaning unit for cooperation with a tool to push the exhaust cleaning unit into a fitting position in the exhaust passage and/or to pull the exhaust cleaning unit out from the fitting position in the exhaust passage.

3. An arrangement according to claim 1, wherein the exhaust cleaning unit is a particle filter unit.

4. An arrangement according to claim 1, further comprising a releasable fittable cover over the exhaust passage.

5. An arrangement according to claim 1, wherein the part of the engine comprises a silencer in the exhaust passage, the exhaust passage passing through an aperture in the silencer, and the exhaust cleaning unit is in the exhaust passage.

6. An arrangement according to claim 1, wherein the annular resilient component further comprises another first contact portion configured, located and operable to come into contact with the wall surface of the exhaust cleaning unit, and the second annular contact portion is located axially between the first contact portion and the another first contact portion.

7. An arrangement according to claim 1, further comprising a fastening device configured for releasably fastening the exhaust cleaning unit in an intended fitting position in the exhaust passage.

8. An arrangement according to claim 1, wherein the second annular contact portion is at an axial distance along the cleaning unit from the first contact portion.

9. An arrangement according to claim 8, wherein the annular resilient component has an external surface which is, from the first contact portion towards the second annular contact portion, at a progressively increasing radial distance from the exhaust cleaning unit.

10. An arrangement according to claim 9, wherein the annular resilient component includes slitlike recesses and intermediate limb portions which define the first contact portion.

\* \* \* \* \*